April 2, 1968 J. C. WHITING 3,375,720
DIFFERENTIAL PRESSURE INDICATOR
Filed Feb. 10, 1966 2 Sheets-Sheet 2
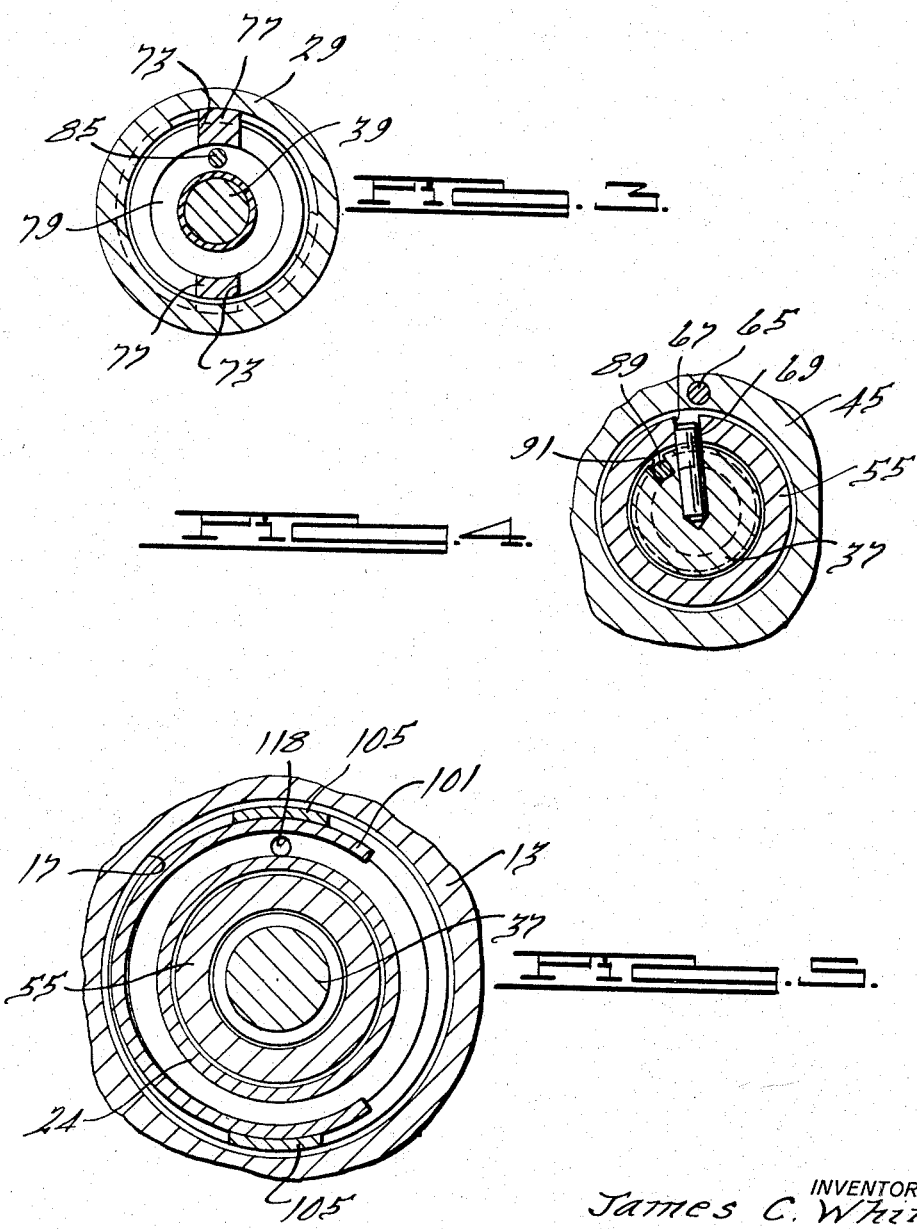
INVENTOR.
James C. Whiting
BY
Carness, Dickey & Pierce
ATTORNEYS.

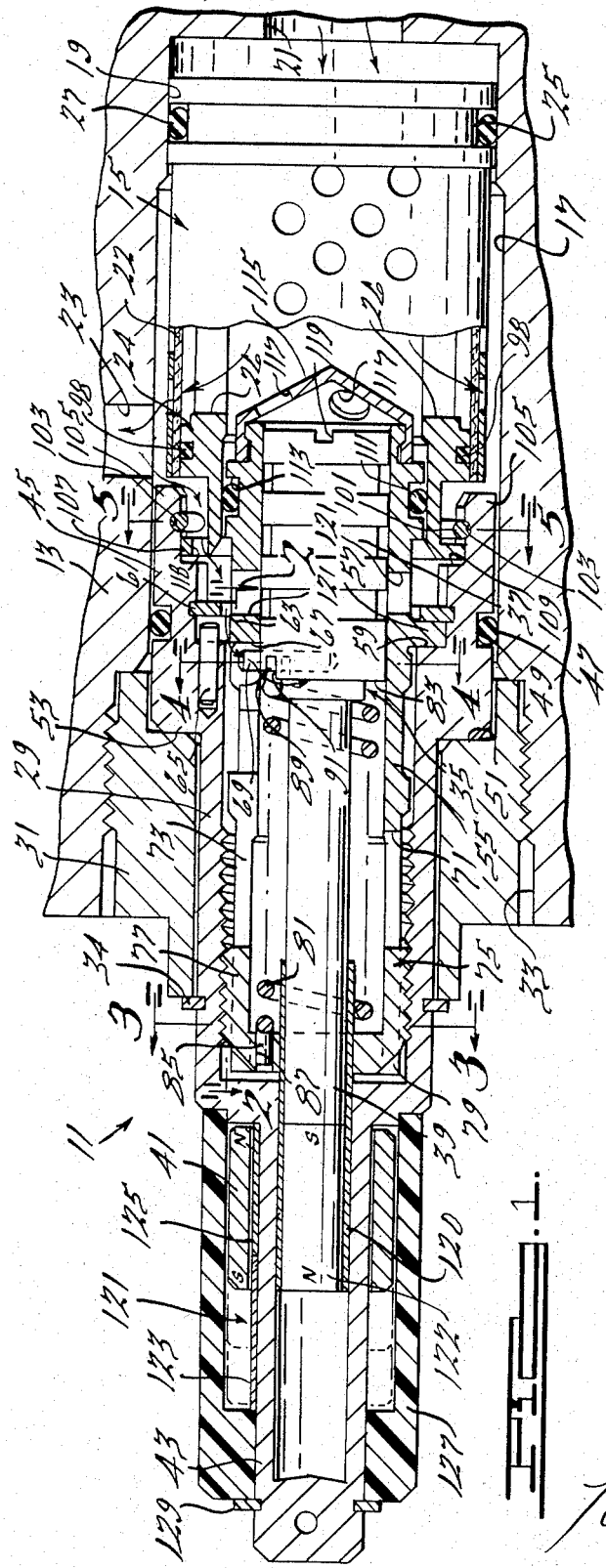

United States Patent Office 3,375,720
Patented Apr. 2, 1968

3,375,720
DIFFERENTIAL PRESSURE INDICATOR
James Clifford Whiting, Royal Oak, Mich., assignor to Michigan-Dynamics, Inc., Detroit, Mich., a corporation of Michigan
Filed Feb. 10, 1966, Ser. No. 526,544
11 Claims. (Cl. 73—419)

ABSTRACT OF THE DISCLOSURE

A differential pressure indicator of the type having a piston exposed to fluid on the upstream and downstream sides of a filter or the like. A spring assists the downstream fluid pressure in biasing the piston. A magnet is carried by the piston and is positioned within a sleeve adjacent an indicating magnet on the outside of the sleeve. When the inner magnet moves with the piston the outer magnet will move with it to indicate the displacement of the piston from a normal position. A laterally projecting pin carried by the piston moves in a slot formed in the surrounding structure and engages spaced shoulders of the slot so that the piston will be held in distinct positions to which it is displaced by the differential fluid pressure and whereby the device can only be reset by disassembling the unit.

---

This invention relates to differential pressure indicators, and more particularly to an improved differential pressure indicator for sensing a difference in pressure between two different fluid media.

It is an object of the present invention to provide a differential pressure indicator which is closed to the atmosphere and which eliminates the need for dynamic seals.

It is another object of the present invention to provide a differential pressure indicator for a fluid system capable of indicating one or more predetermined differential pressure levels and which will remain in the last indicating position reached after the differential pressure condition has subsided, such as, for example, when the pump or other pressure producing source in the system has been turned off.

It is another object of the present invention to provide a differential pressure indicator which cannot be inadvertently reset.

It is another object of the present invention to provide a differential pressure indicator which is relatively inexpensive to manufacture, easily read, rugged in construction and consistent and reliable in use.

Further objects of the present invention will become more apparent from a consideration of the following detailed description taken in conjunction with the drawings in which:

FIGURE 1 is a longitudinal sectional view of a filter assembly showing a differential pressure indicator embodying the present invention in operative association therewith;

FIG. 2 is a sectional view of FIG. 1 taken along the line 2—2 thereof;

FIG. 3 is a sectional view of FIG. 1 taken along the line 3—3 thereof;

FIG. 4 is a sectional view of FIG. 1 taken along the line 4—4 thereof; and

FIG. 5 is a sectional view of FIG. 1 taken along the line 5—5 thereof.

Broadly described, the present invention includes an elongated hollow housing having an outer closed end, piston means slidably disposed in the housing and having its opposite ends exposed to the pressure of two different fluid media, an indicator including a first member movable within said housing outer end with movement of said piston means, a second member outside said housing and magnetically coupled to said first member to indicate differential pressure conditions between said two fluid media.

Referring now more particularly to the drawings, a pressure indicating device 11 embodying the present invention is representatively illustrated in association with a filter assembly including a body 13 and a filter 15. The body 13 has a generally cylindrical bore 17 and a reduced inner end 19 and is formed with an inlet passage 21 and an outlet passage 23. The filter 15 is of hollow, generally cylindrical configuration and includes a cylindrical cartridge 22 mounted on a collar 24 which has its lower end positioned in the reduced bore 19 and is formed with an outer annular groove 25 having an O-ring 27 therein in sealing engagement with the wall of the reduced bore 19. The collar 24 is apertured as at 26 so that fluid admitted to the inlet passage 21 flows into and through the filter cartridge 22 which may be made from woven wire cloth or the like. Thus, from the interior of the cartridge 22, clean fluid flows into the cylindrical bore 17 and out of the device through the outlet passage 23.

The pressure indicator 11 includes a hollow housing 29 fitted into the bore 17 and held in place by a nut 31 threaded into a countersunk upper portion 33 of the bore 17. Movement of the housing 29 into the bore 17 is limited by a snap-ring 34 on the housing 29 and positioned to engage the upper end of the nut 31.

In use, some drop in pressure occurs from the upstream side to the downstream side of the filter 15. As contaminants build up on the filter cartridge 22, many of the filter pores become clogged thereby increasing the pressure drop. At some point, the filter pores may become clogged to an extent that the pressure drop across the filter 15 exceeds the level permissible for proper functioning of the fluid system. The indicator 11 of the present invention is constructed to operate in direct response to the pressure drop across the filter 15 to indicate the occurrence of such a differential pressure. In addition, the device is constructed so that one or more intermediate levels of pressure drops across the filter 15 are indicated to warn of impending dangerous pressure differential conditions in the system. This, in turn, notifies those responsible for maintaining the system that the filter cartridge 22 should be replaced or cleaned.

As shown perhaps best in FIG. 1, piston means 35 is disposed within the housing 29 for movement longitudinally thereof. The piston means 35 is seen to include a piston 37 having an elongate upper rod 39 slidably disposed in the outer or upper end of the housing 29. The piston 37 is exposed at its inner or lower side to the pressure of fluid admitted to the inlet passage 21 and at its upper side to the pressure of the fluid at the outlet passage 23. The piston means 35, therefore, is positioned to move longitudinally within the housing 29 in response to the pressure drop across the filter 15 to indicate the differential level thereof. The rod 39 is operatively associated with a sleeve 41 slidably disposed on the outer surface of the housing 29, which sleeve provides visual indication of movement of the piston means 35 and therefore the existing pressure differential across the filter 15.

The housing 29 comprises a hollow stepped diameter body having a closed upper or outer end 43 and an open lower or inner end 45 fitted within the bore 17. An O-ring 47 is situated in an annular groove 49 in the lower end 45 and sealingly engages the wall of the bore 17 to prevent the flow of fluid therepast. The nut 31 has a radial shoulder 51 positioned to engage a radial shoulder 53 on the housing 29 to retain the device within the body 13.

A sleeve 55 is positioned within the housing 29 and is provided with a radially outwardly extending flange 57 adapted to seat against a radial shoulder 59 in the housing 29. Sleeve 55 is secured within the housing 29 by a retaining ring 61 which engages the flange 57. In addition, the flange 57 has at least one slot 63 positioned to receive a pin 65 press-fitted in the housing 29 to prevent relative turning between these parts. In addition, the slot 63 extends radially inwardly of the housing shoulder 59 so as to permit the clean fluid directed to the outlet passage 23 to communicate with the upper or outer end of the piston 37 in a manner to be described.

The sleeve 55 closely but slidably encases the piston 37 and permits free longitudinal piston movement therewithin. A midportion of the sleeve 55 has a slot 67 positioned to receive a radial pin 69 fixed to the piston 37 to limit piston movement downwardly within the sleeve 55, or to the right as viewed in FIG. 1.

The upper or left-hand end of the sleeve 55 has a pair of diametrically opposed slots 71, 73 which receive a diametrically opposed pair of threaded ears 75, 77 on an internal nut 79 threaded in the housing 29. Conveniently, the slot 73 is a continuation of the slot 67 and since the sleeve 55 and the housing 29 are held against relative turning by the pin 65, the sleeve 55 holds the nut 79 against inadvertent turning within the housing 29 once the parts are assembled.

The piston means 35 is normally biased in a downward or right-hand direction as seen in FIG. 1 by a compression spring 81 having one end within and engaging the nut 79 and its other end engaging a shoulder 83 formed between the rod 39 and the piston 37. Right-hand directional movement of the piston means 35 is limited by engagement of the pin 69 in the bottom of the slot 67. In addition, the spring 81 has a straight wire tang 85 at one end positioned in an opening 87 in the nut 79 and a straight wire tang 89 at its other end fitted in an opening 91 in the piston 37. Thus, by prestressing the spring 81 in a torional fashion before assembling the piston means 35 and the sleeve 55 within the nut 79 and the housing 29, the spring 81 exerts a force tending to turn the piston means 35 relative to the sleeve 55 in addition to the longitudinal biasing force referred to above. The slot 67, as seen best in FIG. 2, has a series of stepped shoulders 93, 95 formed therein spaced upwardly from the bottom thereof or to the left as seen in the figure. The shoulders 93, 95 are also positioned laterally of the slot 67 and from each other in step-like fashion in the direction which the spring 81 tends to turn the piston means 35 relative to the sleeve 55. Thus, in use, when the piston means 35 moves upwardly or to the left as seen in FIGS. 1 and 2, the spring 81 exerts a turning force thereon and causes the pin 69 to move first into seating engagement with the shoulder 93 and then into engagement with the shoulder 95 as shown in broken lines in FIG. 2. In either of these positions, the piston means 35 is prevented from moving downwardly or to the right until the piston means is purposely turned against the torsion of the spring 81. This can only be done by removing the filter 15 from the end of the sleeve 55 and serves a purpose to be described.

As the piston means 35 moves upwardly or to the left as seen in FIGS. 1 and 2, the rod 39 and, therefore, the sleeve 41 also move so that engagement of the pin 69 successively with the shoulders 93, 95 provides a two-stage indication of the pressure conditions in the system. Of course, it will be understood that in some cases, one indicating stage may be adequate while in others, three or more may be required. To accommodate this, the number of shoulders 93, 95 need only be varied accordingly.

The filter cartridge 22 is, as described above, mounted on the collar 24 and is sealed at opposite ends of the apertures 26 by seal rings 98 (only one of which is shown) carried by the collar 24. The collar 24 is removably secured to the housing 29 by a flexible ring-like member 101 which snaps into arcuate recesses 103 formed in a plurality of angularly spaced axially extending fingers 105 which depend from the housing end 45. The collar 24 has an annular flange 107 at its left-hand end which is received between the flexible member 101 and a radial shoulder 109 on the housing 29. An O-ring 111 is positioned in an annular groove 113 in the sleeve 55 and sealingly engages the inner wall of the collar 24 to prevent the flow of fluid therebetween.

The pressure of fluid admitted to the interior of the filter 15 through the inlet passage 21 acts upon the lower or right-hand end of the piston 37 tending to move it in a left-hand direction as seen in FIG. 1. A conical deflector 115 fitted on the end of the sleeve 55 is provided with a number of openings 117 therethrough which permit exposure of the piston 37 to this inlet fluid pressure without the flow of fluid directly impinging thereon. The pressure of fluid at the outlet passage 23 acts upon the left-hand end of the piston 37 by the fluid passing between the housing fingers or projections 105, through an axial passage 118 in the annular flange 107, between the ring 61 and the sleeve 55, through the passage formed by the slot 63 in the flange 57 and through the slot 67 to the left-hand end of the piston 37. In addition, this fluid passes around the rod 39 and acts against the left-hand end thereof. These pressures together with the force of the spring 81 tend to move the piston 37 toward the right, as seen in FIG. 1, and counteract the inlet pressure on the piston 37. When the filter pores have become clogged to an extent where the differential between the pressure of fluid at the outlet passage 23 and that at the inlet passage 21 reaches a predetermined level, the force on the piston 37 tending to move it toward the left exceeds the forces on the piston 37 and on the rod 39 tending to move the piston toward the right sufficiently to move the piston 37 toward the left and cause the pin 69 to seat against the shoulder 93. The sleeve 55 has a plurality of radial by-pass openings 121 which provide a by-pass passage for the direct flow of fluid from the inlet passage 21 to the outlet passage 23 when the piston 37 moves a further distance to the left in response to an excessive pressure drop across the filter 15.

Assuming the inlet fluid pressure to be $Pi$, the outlet fluid pressure to be $Po$, the cross-sectional area of the piston 37 to be $A_{37}$, and the compression force of the spring 81 to be $Fs$, the forces on the piston 37 are represented as follows:

$$PiA_{37} = Fs + PoA_{37}$$

Thus, when $Po$ falls below a predetermined level, the piston 37 moves toward the left and pin 69 seats on the shoulder 93. As $Po$ continues to drop with further filter clogging, the piston 37 moves further to the left until pin 69 seats against the shoulder 95. The force of the spring 81 is easily adjusted for differing installational requirements by threadedly adjusting the nut 79 within the housing 29 before the parts are assembled.

When the filter pores are substantially completely clogged, the piston 37 can move sufficiently far to the left to expose the openings 121 to inlet fluid for direct passage therethrough to the outlet passage 23. Thus, if the device is left unattended, complete clogging of the filter pores will not prevent fluid flow through the system, but the fluid will be by-passed around the filter through the openings 121.

The piston means 35 can only be reset after it is moved to the left by removing the deflector 115 and turning the piston means 35 as by inserting the end of a screwdriver into a slot 119 on the end of the piston 37 and turning it against the torsional force of the spring 81. However, this cannot be done until the indicator unit 11 is removed from the body 13 and the filter 15 removed since the upper end 43 of the housing 29 is closed. Thus, the present invention precludes resetting the device without removing the entire assembly which virtually requires that the filter 15 be cleaned or replaced. In addition, by providing the closed housing upper end 43, all of the movable indicator elements exposed to the pressure of the fluid media are completely sealed from the atmosphere which eliminates the need for any dynamic seals on these moving parts. This greatly increases the life and reliability of this device over those heretofore known and used since seals of this type are subject to wear in use causing inconsistent operation of the indicator and therefore require frequent replacement.

As described above, the visual indicator sleeve 41 is constructed for movement conjointly with the rod 39. This is effected by a bar magnet 122 secured to the outer end of the rod 39 by a sleeve 120 made of non-magnetic material. The indicator sleeve 41 is formed from a permanently magnetized material arranged with its poles reversed relative to the poles of the bar 122 as shown in FIG. 1. The housing 29, of course, is non-magnetic so that as the rod 39 and the associated bar magnet 122 moves therewithin, the sleeve 41 moves conjointly therewith.

Any suitable indicator media may be provided so that as the sleeve 41 moves, an indication of the differential pressure condition in the system is registered. In the device illustrated, a two-color non-magnetic band 121 is mounted on the housing end 43 within the sleeve 41. The band 121 has a green section 123 and a red section 125 so that when the sleeve 41 is positioned fully toward the right as shown in full lines, the red band section 125 is covered and only the green band 123 is exposed for view. When the piston 37 moves toward the left to position the pin 69 against the shoulder 93, which may indicate that the pressure drop across the filter 15 is nearing a dangerous level, the sleeve 41 moves to expose part of the red band section 125 and part of the green band section 123. When the piston 37 moves to seat the pin 69 against the shoulder 95, a dangerous pressure differential condition exists in the system and only the red band 125 section is exposed. A transparent plastic cover 127 is held on the housing end 43 by a snap ring 129 to shield the sleeve 41 and prevent contamination thereof by dirt, grease or other foreign matter to insure proper functioning thereof and permits easy viewing of the band 121.

Once the piston means 35 has been moved sufficiently to the left to position the pin 69 in engagement with the shoulder 95, those responsible for maintaining the system are informed that the pressure drop across the filter 15 has reached a dangerous or undesirable level. To clean or replace the filter cartridge 22 and reset the device, the nut 31 is first unthreaded from within the bore portion 33 after the snap ring 34 is removed whereupon the entire device 11 is removed from the bore 17. The collar 24 is removed from the sleeve 55 after the ring 101 is pried loose and the cartridge 22 slid off the collar 24. The deflector 115 is also removed from the sleeve 55 whereupon the piston means 35 can be turned and reset by placing the end of a screwdriver in the slot 119. Thereafter, the deflector 115 is replaced, a new or clean cartridge 22 mounted on the collar 24 and the collar reassembled on the sleeve 55. The entire device 11 is then placed back in the bore 17, the nut 31 threaded into place and the snap ring 34 replaced.

By the present invention, there has been provided an improved differential pressure indicator device calculated to fulfill the aforementioned objects and advantages and while a preferred embodiment has been illustrated and described above in detail, various additions, substitutions, modifications and omissions may be made thereto without departing from the spirit of the invention as encompassed by the appended claims.

What is claimed is:

1. A differential pressure indicating device for use in a pressurized fluid system having flow obstructing means therein producing a lower pressure on the downstream side than on the upstream side thereof, said indicating device comprising an elongated hollow housing having an outer closed end, a sleeve fixed within said housing, piston means slidably disposed in said sleeve and having opposite sides thereof exposed to said upstream and downstream pressures, respectively, slot means in said sleeve cooperable with a pin fixed to said piston means to releasably hold said piston in a plurality of slidable positions, an indicator movable within said housing outer end and with movement of said piston means to indicate the differential level between said upstream and downstream pressures.

2. A differential pressure indicating device according to claim 1 which includes a compression spring biasing said piston means in a direction assisting said downstream fluid pressure, said spring having one end fixed relative to said housing and the other end fixed to said piston means and exerting a turning force on said piston in one direction, said slot means including a slot in said sleeve having at least one shoulder spaced axially from the bottom thereof, said pin positioned within said slot, said spring normally biasing said piston means in a direction where said pin is in the bottom of said slot, said pin being movable within said slot with movement of said piston means in response to a predetermined pressure differential level to a position adjacent said shouldder, said spring turning said piston means to position said pin in registry with said shoulder.

3. A differential pressure indicating device according to claim 1 which includes a compression spring biasing said piston means in a direction assisting said downstream fluid pressure, said spring having one end fixed relative to said housing and the other end fixed to said piston means and exerting a turning force on said piston in one direction, a sleeve fixed within said housing and encompassing said piston means, a slot in said sleeve having a plurality of shoulders spaced axially from the bottom thereof, a pin fixed to said piston means and positioned within said slot, said spring normally biasing said piston means in a direction where said pin is in the bottom of said slot, said pin being movable within said slot with movement of said piston means in response to predetermined pressure differential levels to positions successively adjacent said shoulders, said spring turning said piston means to position said pin in registry with said shoulders.

4. A differential pressure indicating device for use in a pressurized fluid system having flow obstructing means therein producing a lower pressure on the downstream side than on the upstream side thereof, said indicating device comprising an elongated hollow housing having an outer closed end, piston means slidably disposed in said housing and having opposite sides thereof exposed to said upstream and downstream pressures, respectively, an indicator including a first member movable within said housing outer end and with movement of said piston means, a second member outside said housing and magnetically coupled to first member to indicate the differential level between said upstream and downstream pressures, a compression spring biasing said piston means in a direction assisting said downstream fluid pressure, said spring having one end fixed relative to said housing and the other end fixed to said piston means and exerting a turning force on said piston in one direction, a sleeve fixed within said housing and encompassing said piston means, a slot in said sleeve having at least one shoulder spaced axially from the bottom thereof, a pin fixed to said piston means and positioned within said slot, said spring normally biasing said piston means in a direction where said pin is in the bottom of said slot, said pin being movable within said slot with movement of said piston means in response to a predetermined pressure differential level to a position adjacent said shoulder, said spring turning said piston means to position said pin in registry with said shoulder.

5. A differential pressure indicating device for use in a pressurized fluid system having flow obstructing means therein producing a lower pressure on the downstream side than on the upstream side thereof, said indicating device comprising an elongated hollow housing having an outer closed end, piston means slidably disposed in said housing and having opposite sides thereof exposed to said upstream and downstream pressures, respectively, an indicator including a first member movable within said housing outer end and with movement of said piston means, a second member outside said housing and magnetically coupled to said first member to indicate the differential level between said upstream and downstream pressures, a sleeve encompassing said piston means and fixed within said housing and passage means in said sleeve and between said sleeve and said housing connecting one end of said piston means and said downstream pressure.

6. A differential pressure indicating device for use in a pressurized fluid system having flow obstructing means therein producing a lower pressure on the downstream side than on the upstream side thereof, said indicating device comprising an elongated hollow housing having an outer closed end, piston means slidably disposed in said housing and having opposite sides thereof exposed to said upstream and downstream pressures, respectively, an indicator including a first member movable within said housing outer end and with movement of said piston means, a second member outside said housing and magnetically coupled to said first member, a second member to indicate the differential level between said upstream and downstream pressures, said housing having its inner end removably and sealingly secured within said system and said piston means being accessible for resetting only by removing said housing from said system.

7. A differential pressure indicating device for use in a pressurized fluid system having flow obstructing means therein producing a lower pressure on the downstream side than on the upstream side thereof, said indicating device comprising an elongated hollow housing having an outer closed end, piston means slidably disposed in said housing and having opposite sides thereof exposed to said upstream and downstream pressures, respectively, an indicator including a first member movable within said housing outer end and with movement of said piston means, a second member outside said housing and magnetically coupled to said first member to indicate the differential level between said upstream and downstream pressures, said housing having its inner end removably and sealingly secured within said system and said piston means being accessible for resetting only by removing said housing from said system and wherein said flow obstructing means includes a fluid filter device removably secured to said housing at its inner end.

8. A differential pressure indicating device for use in a pressurized fluid system having flow obstructing means therein producing a lower pressure on the downstream side than on the upstream side thereof, said indicating device comprising an elongated hollow housing having an outer closed end, piston means slidably disposed in said housing and having opposite sides thereof exposed to said upstream and downstream pressures, respectively, an indicator including a first member movable within said housing outer end and with movement of said piston means, a second member outside said housing and magnetically coupled to said first member to indicate the differential level between said upstream and downstream pressures, said piston means and indicator comprising a piston and a piston rod secured thereto, magnetic means on said piston rod and movable within said housing outer end, a magnetic sleeve slidable on the outer surface of said housing outer end, said sleeve and said magnetic means having their poles reversed.

9. A differential pressure indicating device for use in a pressurized fluid system having flow obstructing means therein producing a lower pressure on the downstream side than on the upstream side thereof, said indicating device comprising an elongated hollow housing having an outer closed end, piston means slidably disposed in said housing and having opposite sides thereof exposed to said upstream and downstream pressures, respectively, an indicator including a first member movable within said housing outer end and with movement of said piston means, a second member outside said housing and magnetically coupled to said first member to indicate the differential level between said upstream and downstream pressures, said piston means and indicator comprising a piston and a piston rod secured thereto, magnetic means on said piston rod and movable within said housing outer end, a magnetic sleeve slidable on the outer surface of said housing outer end, said sleeve and said magnetic means having their poles reversed, a band fixed to said housing outer end within said magnetic sleeve whereby said sleeve moves with said piston rod to cover a portion of said band and expose other portions thereof to provide a visual indication of the pressure differential conditions within said system.

10. A differential presure indicating device for use in a pressurized fluid system having flow obstructing means therein producing a lower pressure on the downstream side than on the upstream side thereof, said indicating device comprising an elongated hollow housing having an outer closed end, piston means slidably disposed in said housing and having opposite sides thereof exposed to said upstream and downstream pressures, respectively, an indicator including a first member movable within said housing outer end and with movement of said piston means, a second member outside said housing and magnetically coupled to said first member to indicate the differential level between said upstream and downstream pressures, said piston means and indicator comprising a piston and a piston rod secured thereto, magnetic means on said piston rod and movable within said housing outer end, a magnetic sleeve slidable on the outer surface of said housing outer end, said sleeve and said magnetic means having their poles reversed, a multicolored band fixed to said housing outer end within said magnetic sleeve whereby said sleeve moves with said piston rod to cover a portion of said band and expose other portions thereof to provide a visual indication of the pressure differential conditions within said system.

11. A differential pressure indicating device for use in a pressurized fluid system having flow obstructing means therein producing a lower pressure on the downstream side than on the upstream side thereof, said indicating device comprising an elongated hollow housing having an outer closed end, piston means slidably disposed in said housing and having opposite sides thereof exposed to said upstream and downstream pressures, respectively, an indicator including a first member movable within said housing outer end and with movement of said piston means, a second member outside said housing and magnetically coupled to said first member to indicate the differential level between said upstream and downstream pressures, said piston means and indicator comprising a piston and a piston rod secured thereto, magnetic means on said piston rod and movable within said housing outer end, a magnetic sleeve slidable on the outer surface of said housing outer end, said sleeve and said magnetic means having their poles reversed, a band fixed to said housing outer end within said magnetic sleeve whereby said sleeve moves with said piston rod to cover a portion of said band and expose other portions thereof to provide a visual indication of the pressure differential conditions within said system, and a transparent cover fixed to said housing outer end and enclosing said band and said magnetic sleeve.

References Cited

UNITED STATES PATENTS

| | | | |
|---|---|---|---|
| 2,425,691 | 8/1947 | Brewer | 73—290.1 |
| 3,150,633 | 9/1964 | Holl | 116—117 |
| 3,250,242 | 5/1966 | Pekarek | 116—70 |

LOUIS R. PRINCE, *Primary Examiner.*

D. CORR, *Assistant Examiner.*